(12) United States Patent
Chambers et al.

(10) Patent No.: US 6,445,383 B1
(45) Date of Patent: Sep. 3, 2002

(54) SYSTEM TO DETECT A POWER MANAGEMENT SYSTEM RESUME EVENT FROM A STYLUS AND TOUCH SCREEN

(75) Inventors: Peter Chambers; Omer Lem Wehunt, Jr., both of Phoenix, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/020,629

(22) Filed: Feb. 9, 1998

(51) Int. Cl.[7] ................................................ G08C 21/00
(52) U.S. Cl. .................. 345/173; 178/18.03; 178/18.06
(58) Field of Search .................................. 345/169, 173, 345/179; 178/18.01, 18.03, 18.05, 18.06, 10.07, 19.01, 19.03; 364/707, 709.09; 395/750.01, 750.03, 750.08

(56) References Cited

U.S. PATENT DOCUMENTS

| | | | | |
|---|---|---|---|---|
| 5,451,724 A | * | 9/1995 | Nakazawa et al. | 345/173 |
| 5,590,343 A | * | 12/1996 | Bolan et al. | 395/750 |
| 5,790,875 A | * | 8/1998 | Andersin et al. | 395/750.08 |
| 5,949,408 A | * | 9/1999 | Kang et al. | 345/169 |

* cited by examiner

Primary Examiner—Vijay Shankar
(74) Attorney, Agent, or Firm—Peter Zawilski

(57) ABSTRACT

A system to detect a power management system resume event from a stylus and touch screen. When an electronic device equipped with a touch screen display is within its quiescent low power state, the present invention enables an operator to activate it by touching a stylus or their finger to its touch screen display. Specifically, an embodiment in accordance with the present invention includes a comparator installed within an electronic touch screen device. While the electronic touch screen device is within its quiescent low power state, the comparator determines whether the touch screen display has been touched by comparing an output voltage signal transmitted by the touch screen display with a reference voltage signal. When the touch screen display is touched, the voltage of the output voltage signal becomes greater than the voltage of the reference voltage signal, causing the comparator to transmit a resume event signal. The resume event signal causes the electronic touch screen device to wake up from its quiescent low power state.

24 Claims, 7 Drawing Sheets

SYSTEM TO DETECT A POWER MANAGEMENT SYSTEM RESUME EVENT FROM A STYLUS AND TOUCH SCREEN

TECHNICAL FIELD

The present invention relates to the field of electronic devices which are equipped with touch screen displays. More specifically, the present invention relates to activating an electronic touch screen device from a quiescent low power state.

BACKGROUND ART

There are many different electronic devices available to the general public which offer a wide variety of useful functions to their operators. Several of these electronic devices are equipped with a touch screen display along with a hand-held stylus. Typically, instead of interfacing with these electronic devices through a common keyboard, the operator can utilize the hand-held stylus (or their finger) in conjunction with the touch screen display. For instance, the operator is able to cause the electronic touch screen device to perform specific desired functions by touching the stylus or their finger to its touch screen display. Furthermore, the operator is able to input information into the electronic touch screen device by advantageously writing with the stylus across its touch screen display.

There are many different examples of these electronic touch screen devices such as computer navigation devices installed within automobiles, portable (laptop) computer systems, automated teller machines (ATMs) of commercial banks, point of sale machines located within commercial stores and restaurants, and desktop computer systems. One of the familiar types of electronic touch screen devices is referred to as a personal digital assistant, commonly referred to as a PDA. Currently, one of the well known brands of personal digital assistant is sold under the name of Palm Pilot® and is available from 3Com Corporation of Santa Clara, Calif. The personal digital assistant is a battery powered hand-held touch screen device that is used as an electronic organizer that has the capability to store a wide range of information which can include daily appointments, numerous telephone numbers of business and personal acquaintances, and various other information.

Since personal digital assistants and other electronic touch screen devices are often battery powered, it is very important to prolong the life of their batteries as much as possible. Furthermore, the need also arises to decrease the amount of power consumed by electronic touch screen devices which are powered by a typical wall outlet. One prior art method for prolonging battery life or decreasing power consumption is to provide a button which the operator can push, thereby forcing the touch screen device into its quiescent low power state while it is not being actively used. Once the touch screen device is within the quiescent low power state, its power consumption is maintained at some minimum level. Another prior art method for decreasing power consumption or prolonging battery life is to utilize some type of internal timer to automatically force the touch screen device into its quiescent low power state after a specific amount of non-use time has elapsed.

Within the prior art, if the operator desires to restore the touch screen device to its normal operating mode from its quiescent low power state, the operator needs to push a specific button on the touch screen device. Even though using the button activates the touch screen device from its quiescent low power state, it is not a very convenient way to activate this wake up function. Furthermore, it is not intuitive to the average operator of a touch screen device what specific action is required to restore the device to its normal active operating mode.

Therefore, it would be advantageous to provide a system which activates an electronic touch screen device without requiring the user to manipulate specific buttons. A further need exists for a system which activates an electronic touch screen device without requiring the user to have extensive knowledge of the operation requirements of the electronic touch screen device. The present invention provides these advantages.

DISCLOSURE OF THE INVENTION

The present invention includes a method and system for detecting a power management system resume event from a stylus and touch screen. When an electronic device equipped with a touch screen display is within its quiescent low power state, the present invention enables an operator to activate it by touching a stylus or their finger to its touch screen display. Specifically, an embodiment in accordance with the present invention includes a comparator installed within an electronic touch screen device. While the electronic touch screen device is within its quiescent low power state, the comparator determines whether the touch screen display has been touched by comparing an output voltage signal transmitted by the touch screen display with a reference voltage signal. When the touch screen display is touched, the voltage of the output voltage signal becomes greater than the voltage of the reference voltage signal, causing the comparator to transmit a resume event signal. The resume event signal causes the electronic touch screen device to wake up from its quiescent low power state.

Another embodiment of the present invention is a circuit that activates an electronic touch screen device from its quiescent low power state. The circuit in accordance with the present invention comprises a touch screen display which is adapted to transmit a first signal when it has been touched. The circuit also includes a reference source adapted to transmit a reference signal. Furthermore, a comparator circuit is coupled to receive the first signal from the touch screen display and the reference signal from the reference source. The comparator circuit is adapted to determine whether the touch screen display has been touched by comparing the first signal with the reference signal. The comparator circuit subsequently outputs a second signal in response to the touch screen display being touched which activates the electronic touch screen device from its quiescent low power state.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, a method and system for activating an electronic touch screen device from a quiescent low power state, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention operates in conjunction with any type of electronic device equipped with a touch screen display used for data entry and/or for controlling the functionality of the electronic device. For example, some of the many types of electronic touch screen devices which can be used in accordance with the present invention include computer navigation devices installed within automobiles, portable (laptop) computer systems, automated teller machines (ATMs) of commercial banks, point of sale machines located within commercial stores and restaurants, and desktop computer systems. One of the common types of electronic touch screen devices which can be used in accordance with one embodiment of the present invention is referred to as a personal digital assistant, or commonly called a PDA. The personal digital assistant is a pocket sized electronic organizer with the capability to store telephone numbers, addresses, and daily appointments. The personal digital assistant also has the ability to connect to a personal computer, enabling the two devices to exchange updated information. Furthermore, an advanced personal digital assistant can also be connected to a modem, enabling it to have electronic mail (e-mail) capabilities over the internet, and often includes software that keeps track of expenses.

Figure 1A:
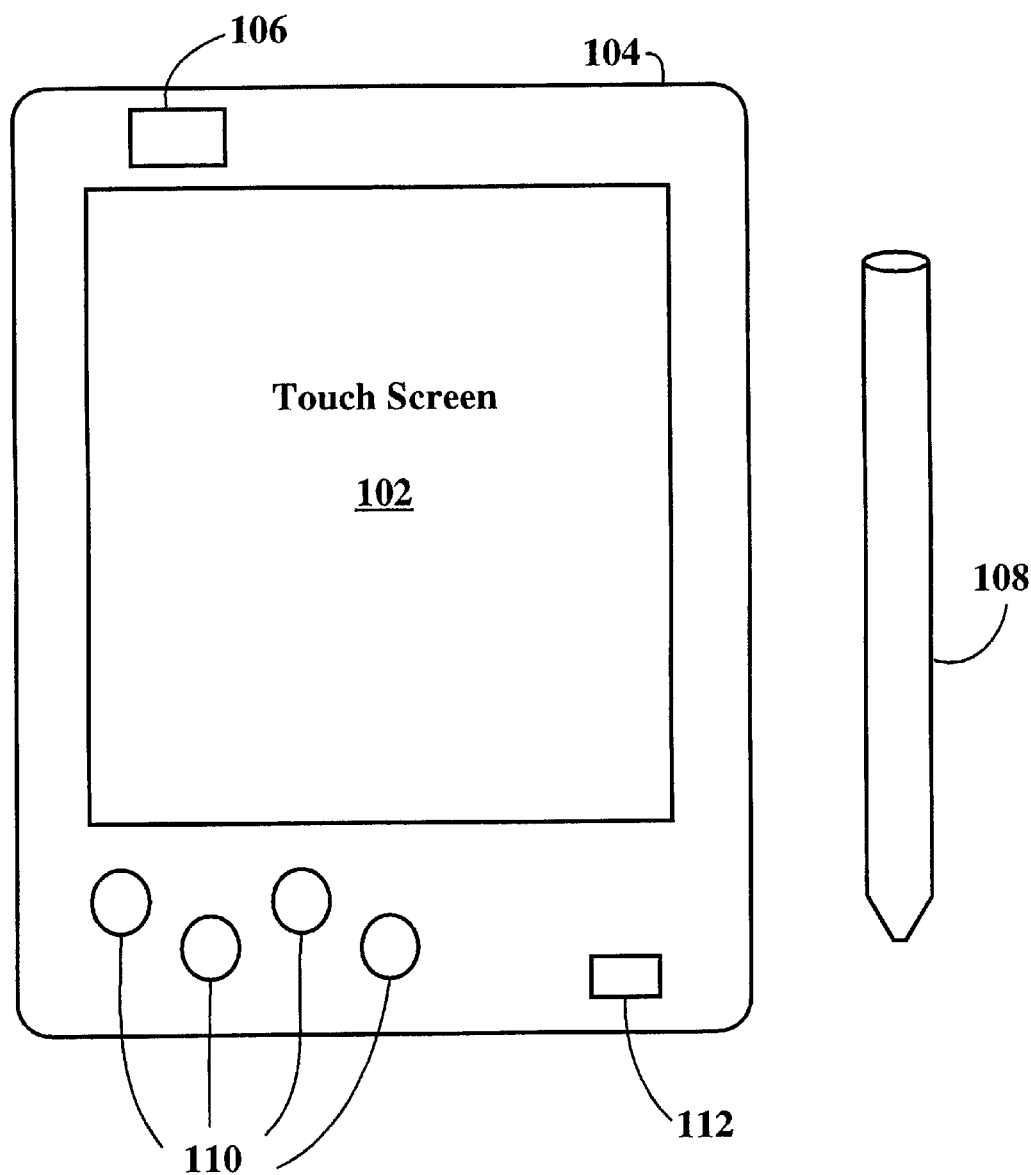
FIG. 1A is a schematic top view of a personal digital assistant system in accordance with one embodiment of the present invention.

FIG. 1A is a schematic top view of a personal digital assistant system 100 in accordance with one embodiment of the present invention. Personal digital assistant system 100 includes a stylus 108 and a personal digital assistant 104 which further comprises an on/off button 106, a plurality of function buttons 110, and a quiescent low power state button 112. An operator of personal digital assistant 104 is able to turn it on and off by using on/off button 106. Furthermore, the operator can control some of the functionality of personal digital assistant 104 by using its plurality of function buttons 110. Moreover, the operator can utilize stylus 108 in conjunction with touch screen display 102 to cause personal digital assistant 104 to perform many different functions. One such function is the entering of data. For example, data is typically entered by simply writing with stylus 108 across touch screen 102. Another such function is the selecting of different functional operations of personal digital assistant 104, which is accomplished by advantageously touching stylus 108 to specific areas of touch screen 102.

Optionally, personal digital assistant 104 of FIG. 1A can be equipped with a button 112, which an operator can push in order to force personal digital assistant 104 into its quiescent low power state while it is not being actively used. Conversely, instead of personal digital assistant 104 being equipped with button 112, it could be equipped with an internal timer (not shown) that automatically forces personal digital assistant 104 into its quiescent low power state after a specific amount of non-use time has elapsed.

Figure 1B:
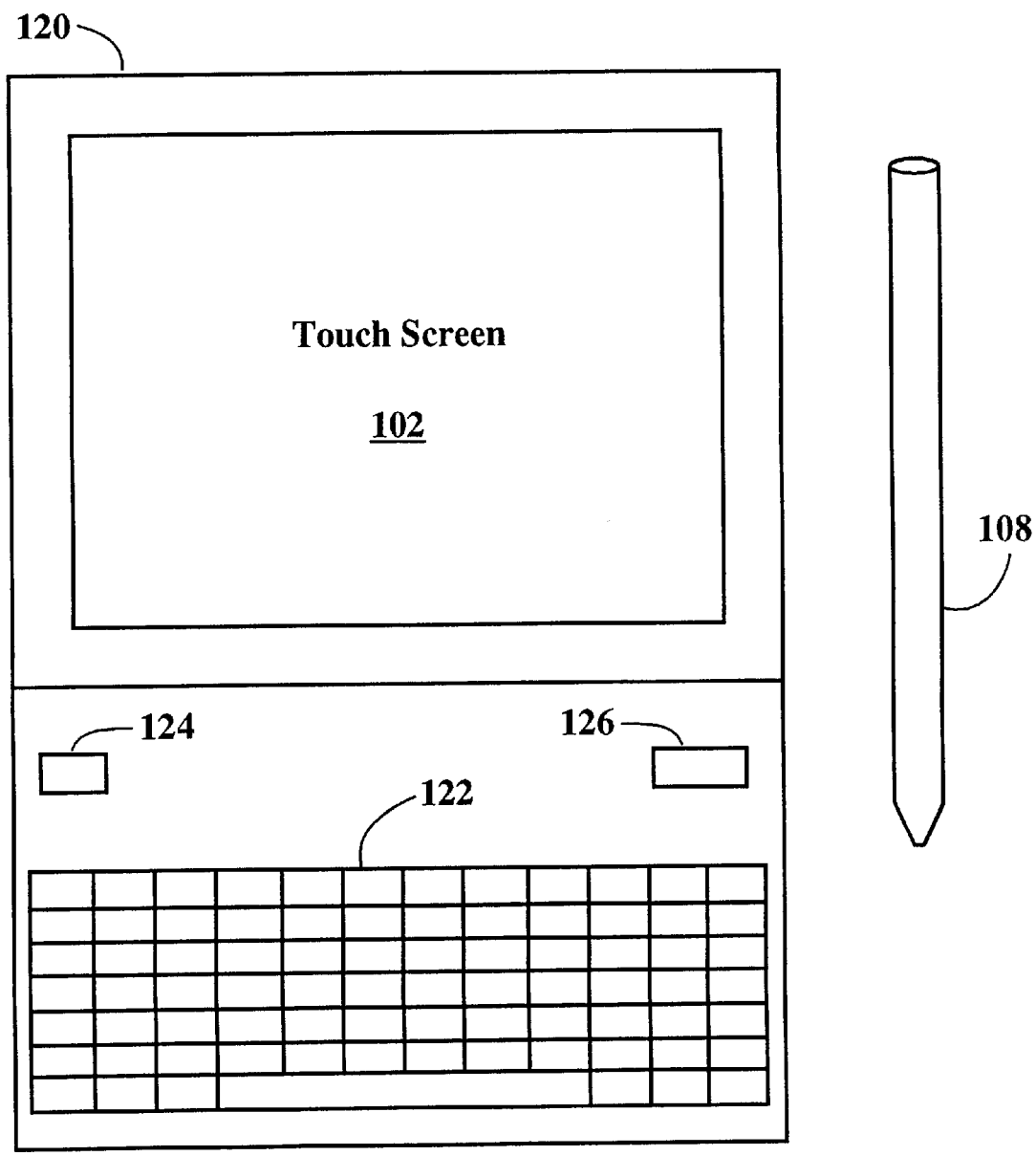
FIG. 1B is a schematic top view of a portable (laptop) personal computer system in accordance with another embodiment of the present invention.

FIG. 1B is a schematic top view of a portable (laptop) personal computer system 150 in accordance with another embodiment of the present invention. Portable personal computer system 150 includes a stylus 108 and a portable personal computer 120 which further comprises an on/off button 126, a standard alpha/numeric keyboard 122, and a quiescent low power state button 124. An operator of portable personal computer 120 is able to turn it on and off by using on/off button 126. Furthermore, the operator can enter information and control some of the functionality of portable personal computer 120 using keyboard 122. Moreover, the operator can utilize stylus 108 in conjunction with touch screen display 102 to cause portable personal computer 120 to perform many different functions. One such function is the entering of data. For example, data is typically entered by simply writing with stylus 108 across touch screen 102. Another such function is the selecting of different functional operations of portable personal computer 120, which is accomplished by advantageously touching stylus 108 to specific areas of touch screen 102.

Optionally, portable personal computer 120 of FIG. 1B can be equipped with a button 124, which an operator can push in order to force portable personal computer 120 into its quiescent low power state while it is not being actively used. Conversely, instead of portable personal computer 120 being equipped with button 124, it could be equipped with an internal timer (not shown) that automatically forces portable personal computer 120 into its quiescent low power state after a specific amount of non-use time has elapsed.

Figure 2:
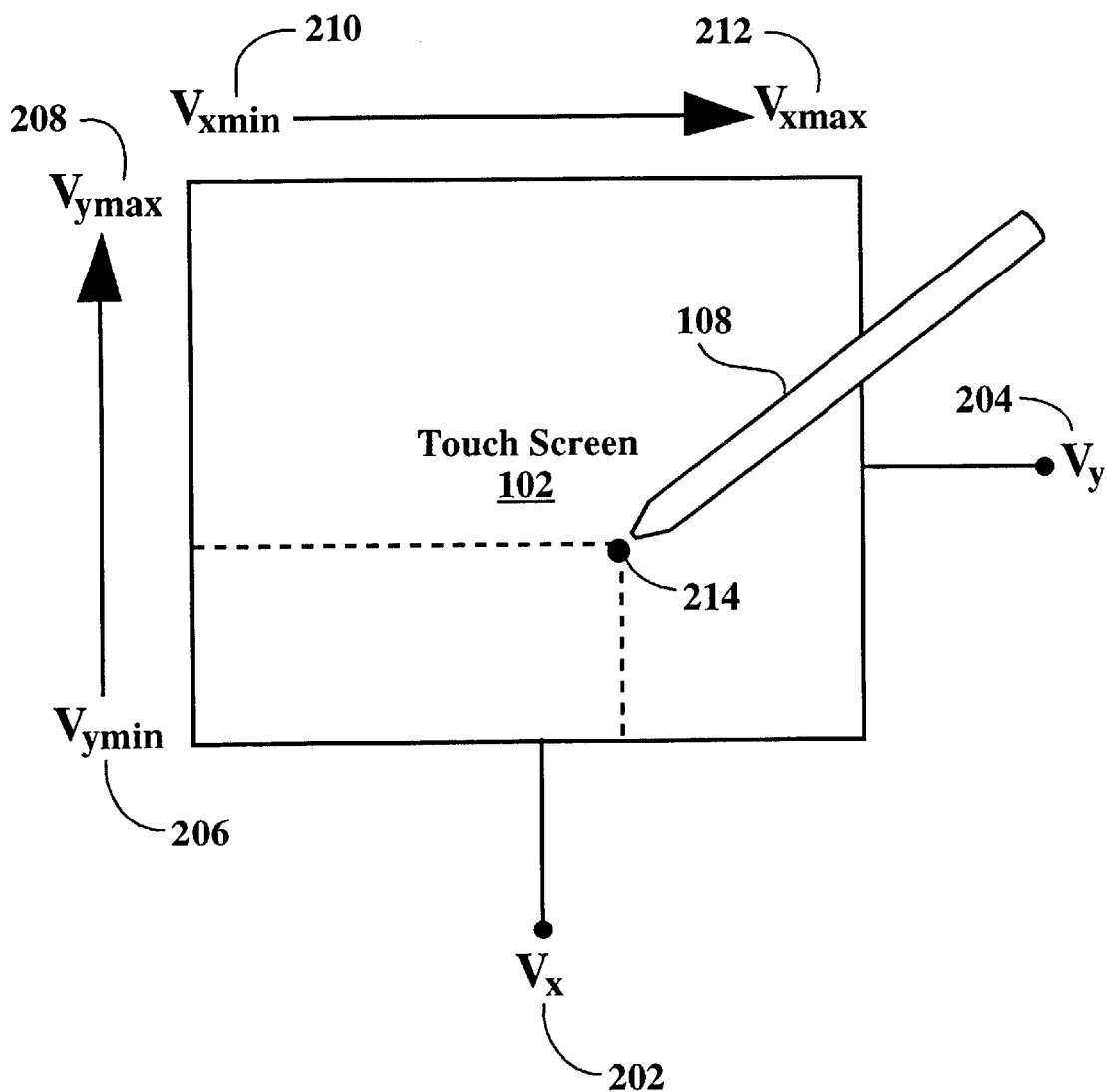
FIG. 2 is a graphic representation of a sensing mechanism system of a touch screen system for use in an electronic touch screen device in accordance with one embodiment of the present invention.

FIG. 2 is a graphic representation of a sensing mechanism system 200 of touch screen 102 for use in an electronic touch screen device (e.g., portable personal computer 120 of FIG. 1B) in accordance with one embodiment of the present invention. In the present embodiment, touch screen 102 functions by employing a mechanism (e.g., resistive films) which produces two separate output signals. These output signals are analog voltages which correspond to the position of stylus 108 (or an operator's finger) when it touches touch screen display 102. Output voltage $V_x$ 202 of touch screen display 102 corresponds to the X coordinates of touch screen display 102, while output voltage $V_y$ 204 corresponds to the Y coordinates of touch screen display 102. The voltage of $V_x$ 202 ranges from a minimum voltage $V_{xmin}$ 210 to a maximum voltage $V_{xmax}$ 212, which directly corresponds to the range of X coordinates that extend from the left edge of touch screen display 102 to its right edge. Furthermore, the voltage of $V_y$ 204 ranges from a minimum voltage $V_{ymin}$ 206 to a maximum voltage $V_{ymax}$ 208, which directly corresponds to the range of Y coordinates that extend from the bottom edge of touch screen display 102 to its top edge. Therefore, when stylus 108 (or a user's finger) comes in contact with touch screen display 102 at dot 214, touch screen display 102 outputs a specific $V_x$ 202 and a specific $V_y$ 204, which together correspond to the position of stylus 108 (or a finger) on touch screen display 102 (e.g., dot 214). It should be appreciated that there are several conventional technologies for implementing these coordinate voltages within touch screen display 102.

Figure 3:
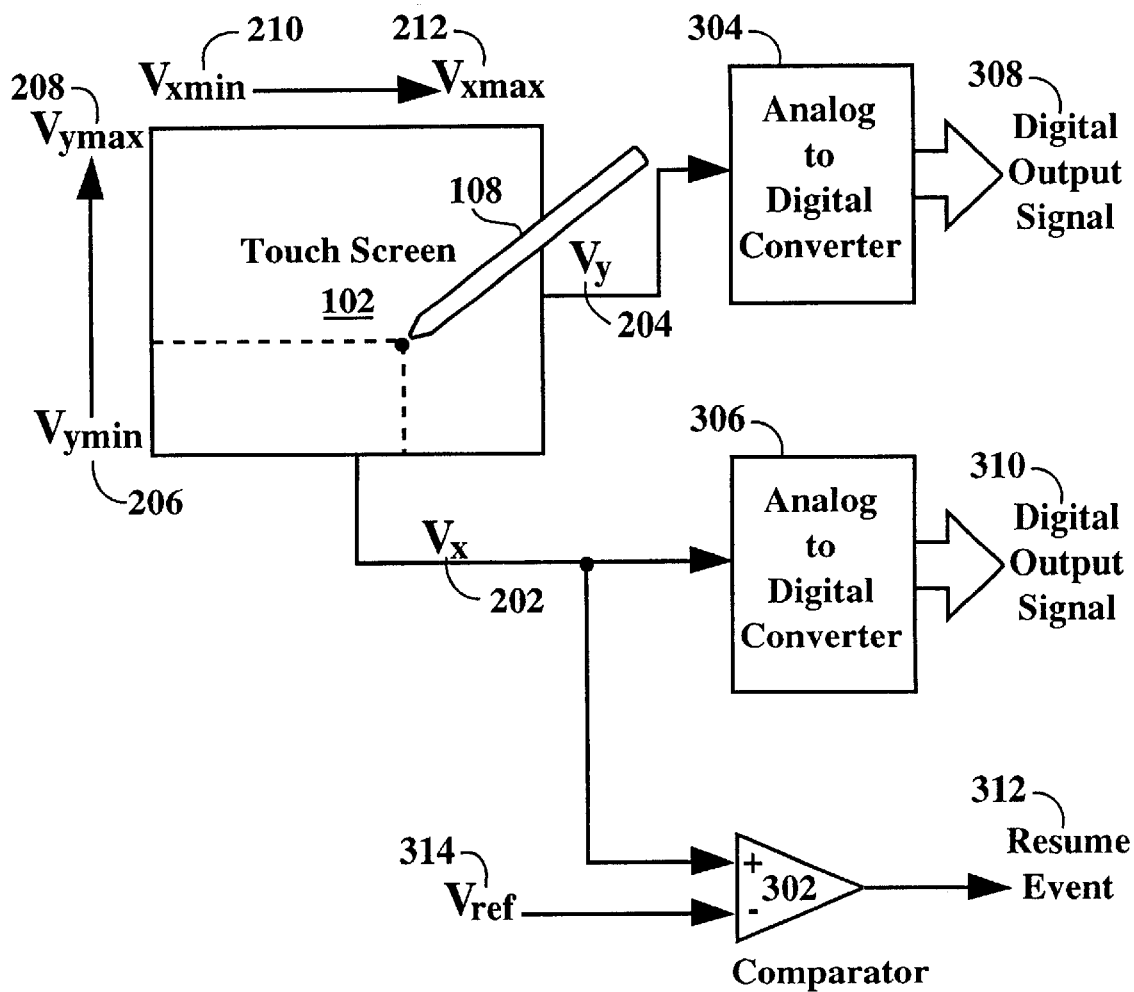
FIG. 3 is a block diagram of a touch screen system in accordance with one embodiment of the present invention for activating an electronic touch screen device from its quiescent low power state.

FIG. 3 is a block diagram of a touch screen system 300 in accordance with one embodiment of the present invention for activating or "waking up" an electronic touch screen device (e.g., personal digital assistant 104 of FIG. 1A) from its quiescent low power state. As described above, when stylus 108 (or a user's finger) comes in contact with touch screen display 102 during its normal operations, it outputs an analog Y coordinate output voltage signal $V_y$ 204 and an analog X coordinate output voltage signal $V_x$ 202. $V_y$ 204 is coupled to an analog to digital converter circuit 304, where it is converted to a digital output signal 308. $V_x$ 202 is coupled to an analog to digital converter circuit 306, where it is converted to a digital output signal 310. Digital output signals 308 and 310 are used by an electronic touch screen device for pixel generation, processing procedures, and so forth.

An electronic touch screen device (e.g., portable personal computer 120 of FIG. 1B) can enter its quiescent low power state numerous ways, as described above. For instance, an operator of an electronic touch screen device can push a button forcing it into its quiescent low power state or an internal timer located within the electronic touch screen device can automatically force it into its quiescent low power state after a specific amount of non-use time has elapsed. The present invention involves activating or "waking up" an electronic touch screen device from its quiescent low power state, and is not concerned with the manner in which the electronic touch screen device entered into its quiescent low power state.

When an electronic touch screen device (e.g., personal digital assistant 104 of FIG. 1A) is within its quiescent low power state, touch screen display 102 of FIG. 3 is suspended at the minimum voltage levels of $V_{ymin}$ 206 and $V_{xmin}$ 210, while analog to digital converter circuits 304 and 306 are turned off. One of the inputs of a voltage comparator circuit 302 is coupled to receive $V_x$ 202 from touch screen display 102. The other input of voltage comparator circuit 302 is coupled to receive a reference voltage signal $V_{ref}$ 314, which is set at some specific minimum voltage level. Voltage comparator 302 compares the voltage of $V_x$ 202 with the voltage of $V_{ref}$ 314. It should be appreciated that the present invention is well suited to an embodiment in which a voltage comparator is implemented with software.

If the voltage of $V_x$ 202 of FIG. 3 is greater than the voltage of $V_{ref}$ 314, voltage comparator circuit 302 outputs a resume event signal 312 which causes an electronic touch screen device to "wake up" from its quiescent low power state and return to its normal operations. Typically, resume event signal 312 is an interrupt signal that is transmitted to the processor (not shown) of the electronic touch screen device. This embodiment, in accordance with the present invention, enables an operator to touch stylus 108 (or their finger) to touch screen display 102 in order to activate or "wake up" the electronic touch screen device from its quiescent low power state. The resulting outcome of the present invention system activates an electronic touch screen device from its quiescent low power state without requiring the user to manipulate specific buttons. Furthermore, the present invention system activates an electronic touch screen device without requiring the user to have extensive knowledge of the operation requirements of the electronic touch screen device.

It should be appreciated that the voltages of $V_x$ 202 and $V_y$ 204 output by touch screen display 102 of FIG. 3, in accordance with the present invention, are not strictly limited to positive voltages. The present invention is equally well suited to employ negative voltages for $V_x$ 202 and $V_y$ 204. In a case where $V_x$ 202 and $V_y$ 204 are negative voltages, the voltage of $V_{ref}$ 314 changes and voltage comparator circuit 302 is connected differently to enable it to detect the change in $V_x$ 202 resulting from the touching of touch screen 102. For example, voltage comparator circuit 302 detects when touch screen 102 has been touched when the voltage of $V_x$ 202 is less than the voltage of $V_{ref}$ 314.

$V_{ref}$ 314 of FIG. 3 may be provided to comparator circuit 302 by numerous different voltage sources. For instance, $V_{ref}$ 314 may be provided by a voltage source located within the electronic touch screen device, e.g., by an application specific integrated circuit (ASIC). Moreover, $V_{ref}$ 314 may be supplied via a voltage source which is external to the electronic touch screen device. Furthermore, $V_{ref}$ 314 may be provided by a digital to analog converter circuit which is programmable via a central processing unit (CPU) accessible register. By using the central processing unit, the voltage of $V_{ref}$ 314 has the ability to be adjusted for varying wake up detection voltage levels for different screens and varying conditions. In order to exclude any spurious wake up events of the electronic touch screen device, $V_{ref}$ 314 should be set at a slightly higher voltage than the minimum voltage of $V_{xmin}$ 210.

Within another embodiment in accordance with the present invention, voltage comparator circuit 302 of FIG. 3 is located within analog to digital converter circuit 306. In this embodiment, voltage comparator circuit 302 shares the power supply (not shown) of analog to digital converter circuit 306.

Figure 4:
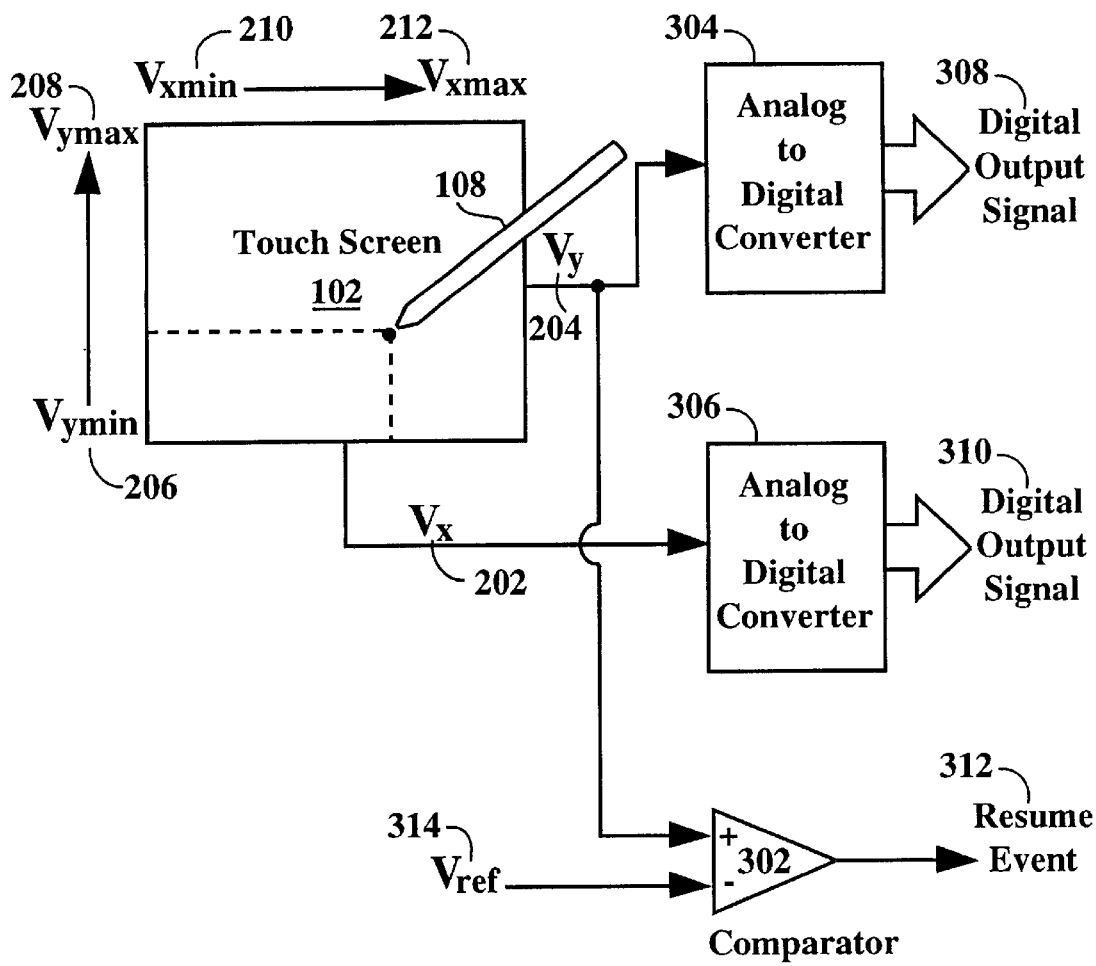
FIG. 4 is a block diagram of a touch screen system in accordance with another embodiment of the present invention for activating an electronic touch screen device from its quiescent low power state.

FIG. 4 is a block diagram of a touch screen system 400 in accordance with another embodiment of the present invention for waking up any type of electronic touch screen device (e.g., portable personal computer 120 of FIG. 1B) from its quiescent low power state. Touch screen system 400 is connected and operates in a similar manner as touch screen system 300 of FIG. 3, except that one of the inputs of voltage comparator circuit 302 is connected to a different voltage source. Voltage comparator circuit 302 of FIG. 4 is connected to receive $V_y$ 204 from touch screen display 102. The other input of the voltage comparator circuit 302 is connected to receive $V_{ref}$ 314, which is set at some specific minimum voltage that is slightly higher than the minimum voltage of $V_{ymin}$ 206. Voltage comparator circuit 302 compares the voltage of $V_y$ 204 against the voltage of $V_{ref}$ 314. If the voltage of $V_y$ 204 is greater than the voltage of $V_{ref}$ 314, voltage comparator circuit 302 outputs a resume event signal 312 which causes an electronic touch screen device to wake up from its quiescent low power state and return to its normal operations. As described above, this embodiment, in accordance with the present invention, enables an operator to advantageously touch stylus 108 (or their finger) to touch screen 102 in order to activate an electronic touch screen device from its quiescent low power state.

Within another embodiment in accordance with the present invention, voltage comparator circuit 302 of FIG. 4 is located within analog to digital converter circuit 304. In this embodiment, voltage comparator circuit 302 shares the power supply (not shown) of analog to digital converter circuit 304.

Figure 5:
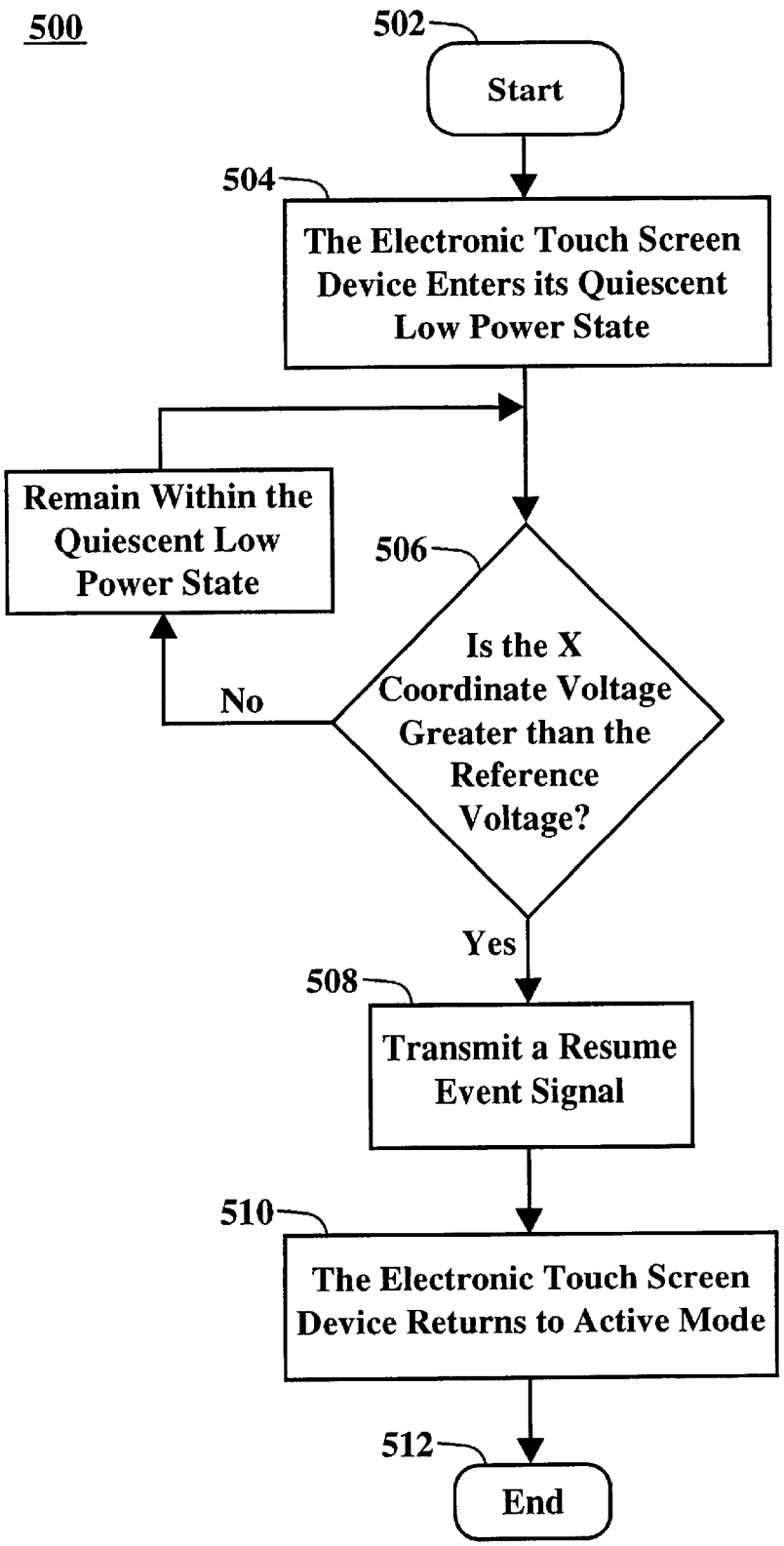
FIG. 5 is a flowchart of a method in accordance with one embodiment of the present invention for activating an electronic touch screen device from its quiescent low power state.

FIG. 5 is a flowchart of a method 500 in accordance with one embodiment of the present invention for activating an electronic touch screen device (e.g., personal digital assistant 104 of FIG. 1 A) from its quiescent low power state. FIG. 5 shows process 500 which starts at step 502. During step 504 the electronic touch screen device enters its quiescent low power state.

During step 506 of FIG. 5, a voltage comparator circuit ascertains if the touch screen display of the electronic touch screen device has been touched by determining whether the voltage of the X coordinate voltage signal output by the touch screen display is greater than the voltage of a reference voltage signal. During step 506, if the X coordinate voltage signal is not greater that the reference voltage signal, the voltage comparator circuit returns to the beginning of step 506 and the electronic touch screen device remains within its quiescent low power state. If the X coordinate voltage signal is greater than the reference voltage signal during step 506, the voltage comparator circuit proceeds to step 508.

During step 508 of FIG. 5, the voltage comparator circuit transmits a resume event signal to the processor of the electronic touch screen device.

During step 510 of FIG. 5, the processor of the electronic touch screen device receives the resume event signal causing the electronic touch screen device to return to its active mode of normal operation.

The electronic touch screen device exits process 500 of FIG. 5 during step 512.

Figure 6:
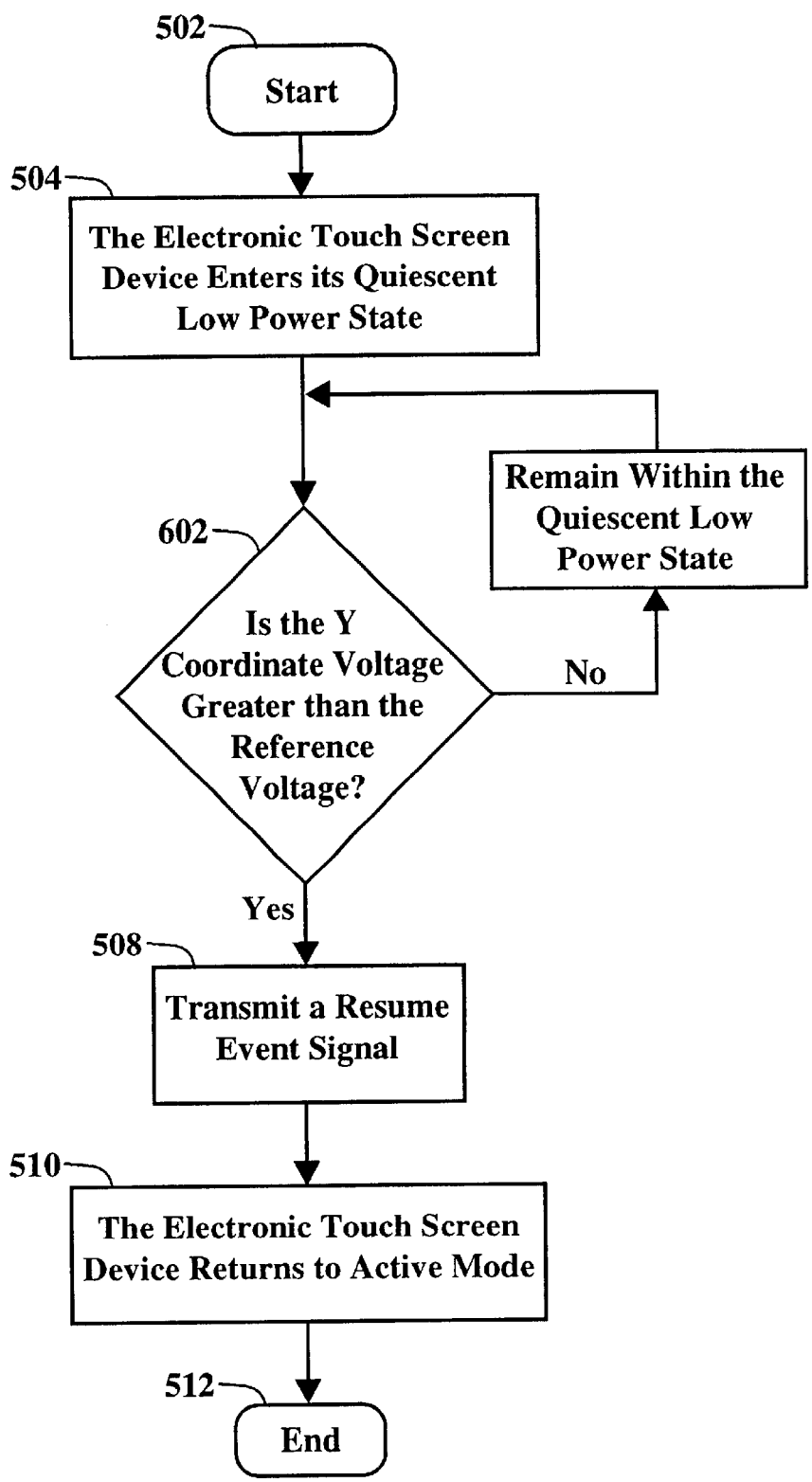
FIG. 6 is a flowchart of a method in accordance with another embodiment of the present invention for activating an electronic touch screen device from its quiescent low power state.

FIG. 6 is a flowchart of a method 600 in accordance with another embodiment of the present invention for activating an electronic touch screen device (e.g., portable personal computer 120 of FIG. 1B) from its quiescent low power state. FIG. 6 shows process 600 which is similar to process 500 of FIG. 5 in that steps 502, 504, 508, 510, and 512 of process 600 are the same steps as described within process 500.

During step 602 of FIG. 6, a voltage comparator circuit ascertains if the touch screen display of the electronic touch screen device has been touched by determining whether the voltage of the Y coordinate voltage signal output by the touch screen display is greater than the voltage of a reference voltage signal. During step 602, if the Y coordinate voltage signal is not greater that the reference voltage signal, the voltage comparator circuit returns to the beginning of step 602 and the electronic touch screen device remains within its quiescent low power state. If the Y coordinate voltage signal is greater than the reference voltage signal during step 602, the voltage comparator circuit proceeds to step 508.

Thus, the wake up system of the present invention activates an electronic touch screen device from it quiescent low power state without requiring the user to manipulate specific buttons. Moreover, the present invention system activates an electronic touch screen device without requiring the user to have extensive knowledge of the operation requirements of the electronic touch screen device. In addition, the wake up system of the present invention does not require any type of clocking signal to operate, enabling analog to digital converter circuits 304 and 306 of FIGS. 3 and 4 which utilize a clocking signal to remain off when the electronic touch screen device is within its quiescent low power state. Furthermore, since the wake up system of the present invention has a very low power requirement during operation, it does not adversely affect the battery life or power consumption of the electronic touch screen device.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for activating an electronic touch screen device from a quiescent low power state, said system comprising:

a touch screen display means for transmitting an output voltage signal when said touch screen display means has been touched;

a programmable voltage source means for transmitting a reference voltage which can be adjusted for different conditions; and a comparator means for determining whether said touch screen display means has been touched by comparing said output voltage signal from said touch screen display means with said reference voltage from said programmable voltage source means, said comparator means outputs a resume event signal in response to said touch screen display means being touched, wherein said resume event signal activates said electronic touch screen device from said quiescent low power state.

2. The system as described in claim 1 wherein said comparator means determines that said touch screen display means has been touched when the voltage of said output voltage signal is greater than the voltage of said reference voltage.

3. The system as described in claim 1 wherein said comparator means determines that said touch screen display means has been touched when the voltage of said output voltage signal is less than the voltage of said reference voltage.

4. The system as described in claim 1 wherein said output voltage signal represents a coordinate position of said touch screen display means corresponding to where said touch screen display means has been touched.

5. The system as described in claim 4 wherein said electronic touch screen device is an electronic hand-held touch screen device.

6. The system as described in claim 4 wherein said comparator means is implemented with software means.

7. The system as described in claim 4 wherein said programmable voltage source means is external to said electronic touch screen device.

8. The system as described in claim 1 wherein said programmable voltage source means is a programmable digital to analog converter means.

9. An electronic touch screen device wake up system, said system comprising:

a touch screen display means for transmitting an output voltage signal when said touch screen display means has been touched;

a power supply means for supplying power to said touch screen display means;

a programmable voltage source means for transmitting a reference voltage signal which can be adjusted for different conditions; and a comparator means for determining whether said touch screen display means has been touched by comparing said output voltage signal from said touch screen display means with said reference voltage signal from said programmable voltage source means, said comparator means outputs a resume event signal in response to said touch screen display means being touched, wherein said resume event signal activates an electronic touch screen device from a quiescent low power state.

10. The system as described in claim 9 wherein said comparator means determines that said touch screen display means has been touched when the voltage of said output voltage signal is greater than the voltage of said reference voltage signal.

11. The system as described in claim 9 wherein said comparator means determines that said touch screen display means has been touched when the voltage of said output voltage signal is less than the voltage of said reference voltage signal.

12. The system as described in claim 9 wherein said comparator means is implemented with software means.

13. The system as described in claim 12 wherein said programmable voltage source means is located within said electronic touch screen device.

14. The system as described in claim 12 wherein said programmable voltage source means is external to said electronic touch screen device.

15. The system as described in claim 12 wherein said programmable voltage source means is a programmable digital to analog converter means.

16. The system as described in claim 12 wherein said electronic touch screen device is an electronic hand-held touch screen device.

17. A method for activating an electronic touch screen device from a quiescent low power state, said method comprising:

(a) determining whether a touch screen display means of said electronic touch screen device has been touched while said electronic touch screen device is within said quiescent low power state by comparing an output voltage signal transmitted from said touch screen display means with a programmable reference voltage which can be adjusted for different conditions;

(b) transmitting a resume event signal in response to said touch screen display means being touched; and (c) activating said electronic touch screen device from said quiescent low power state in response to said resume event signal.

18. The method as described in claim 17 wherein (a) and (b) are performed by a comparator means.

19. The method as described in claim 18 wherein said programmable reference voltage is output by a programmable voltage source means.

20. The method as described in claim 19 wherein said programmable voltage source means is located within said electronic touch screen device.

21. The method as described in claim 19 wherein said programmable voltage source means is external to said electronic touch screen device.

22. The method as described in claim 19 wherein said electronic touch screen device is an electronic hand-held touch screen device.

23. The method as described in claim 18 wherein said comparator means is implemented with software means.

24. The method as described in claim 18 wherein said comparator means is implemented with hardware means.

* * * * *